July 9, 1968 HANS-DIETER SCHNEIDER 3,392,302
TRANSISTOR AMPLIFIER FOR CAPACITOR-COUPLED VERTICAL
DEFLECTION COILS IN TELEVISION
Filed Nov. 14, 1966 2 Sheets-Sheet 1

Inventor:
Hans-Dieter Schneider
by Michael S. Striker
Attorney

July 9, 1968 HANS-DIETER SCHNEIDER 3,392,302

TRANSISTOR AMPLIFIER FOR CAPACITOR-COUPLED VERTICAL DEFLECTION COILS IN TELEVISION

Filed Nov. 14, 1966 2 Sheets-Sheet 2

Inventor:
Hans-Dieter Schneider
by Michael S. Striker
Attorney

United States Patent Office 3,392,302

Patented July 9, 1968

3,392,302

TRANSISTOR AMPLIFIER FOR CAPACITOR-COUPLED VERTICAL DEFLECTION COILS IN TELEVISION

Hans-Dieter Schneider, Gross-Gerau, Germany, assignor to Fernseh GmbH, Darmstadt, Germany Continuation-in-part of application Ser. No. 278,606, May 7, 1963. This application Nov. 14, 1966, Ser. No. 593,767

5 Claims. (Cl. 315—27)

ABSTRACT OF THE DISCLOSURE

A transistorized common collector circuit for vertical deflection in television apparatus. The inherent stability features of the circuit are utilized through a common emitter driving stage and a common collector output stage. The common collector output stage energizes the deflection coils of a cathode ray tube. A coupling capacitor is connected between the output stage and the deflection coil. A power supply is connected across the emitter-collector paths of both the driving stage and the output stage. A voltage divider included in the power supply circuit applies voltages to the driving stage as well as to the output stage so that the transistor of the common collector output stage is maintained in its conducting state during the entire period of deflection of the deflection coils, including the flyback interval.

The present invention relates to a transistor amplifier for capacitor-coupled vertical deflection coils in television apparatus, utilizing substantially linear sawtooth signals. This application is a continuation-in-part of my copending application Ser. No. 278,606, filed May 7, 1963, now abandoned.

It is common practice to apply a transistorized common-emitter circuit for the deflection stage in vertical deflection apparatus. This arrangement, however, has the disadvantage that its amplification varies considerably with temperature, the selected operating or quiescent point, and the voltage level of the power supply. These variations affect very adversely the stability of the deflection amplitude.

For the purpose of overcoming these disadvantages, one may apply a common-collector circuit since its amplification is substantially unity. Assuming, hence, that one connects such a common-collector circuit to a vertical deflection coil by way of a coupling capacitor, the latter is required to isolate the direct-current component in the circuit. This last or output stage may then be operated so that the transistor is made further conductive, during the retrace interval, as a result of the inductive energy of the coil. The latter, in form of a voltage peak, affects the emitter in a manner such that the retrace or reset time is increased to an extent that the requirements for proper operation of the television apparatus cannot be met.

The preceding disadvantage results from the low output impedance of the circuit as well as the further low impedance encountered by the feed back. This is especially reflected in the undesirable $L/R$ ratio of the deflection circuit comprising the deflection coil with its inductivity L and all ohmic resistances $r$ and the generator impedance. The output stage may, however, be operated so that the return energy affects the transistor in a manner which cuts the latter off as a result of the displacement of its quiescent point through the null of the characteristic curve. The internal impedance of the transistor is thereby considerably increased, and the retrace cannot aperiodically decay during the retrace or reset time. As a result, severe nonlinearities appear at the beginning of the forward trace due to the curvature of the characteristic in the vicinity of the initial operating point of the transistor. Aside from this, it is necessary to select a larger coupling capacitor due to the low output impedance of the common collector circuit. A smaller capacitor may be applied with a common emitter circuit. Large coupling capacitors imply undesirably large dimensions of these components.

Accordingly, it is an object of the present invention to provide a transistorized common-collector circuit for vertical deflection in television apparatus, which is free from the aforementioned inherent disadvantages.

Another object of the present invention is to provide a common collector circuit for vertical deflection in television apparatus, of the character described, wherein the inherent stability features of the circuit are utilized to realize the desired results.

A further object of the present invention is to provide a circuit, as described, which is reliable in operation and may be maintained economically.

A still further object of the present invention is to provide a circuit, as set forth, which may be readily manufactured and assembled.

With the preceding objects in view, the present invention comprises (a) A common-emitter driving stage including transistor means;

(b) A common-collector output stage including transistor means;

(c) Conductor means conductively connecting the collector of said transistor means of said driving stage to the base of the transistor means of said output stage;

(d) Cathode-ray tube deflection coil means;

(e) Conductor means connecting said common-collector output stage to said cathode-ray tube deflection coil means;

(f) Coupling capacitor means arranged in said latter conductor means;

(g) A power supply connected to said common-collector output stage;

(h) First resistor means arranged in the connection between said power supply and said common-collector output stage means; and (i) Second resistor means connected between the collector of said transistor means of said common-emitter driving stage and the collector of said transistor means of said common-collector output stage.

The output transistor of the circuit, in accordance with the present invention, is driven so that the voltage peaks, during retrace or reset, functions to cut off the circuit. Complete cut-off of the transistor, however, is inhibited through specific circuit elements. As a result, the disadvantage of a degenerating saw-tooth current, in flowing through nonlinear parts of the characteristics, is avoided. At the same time, the coupling capacitor may be made smaller as nonlinearities during the forward trace resulting from an integrating effect of the capacitor appear at the base of the common collector stage and become more or less compensated. Therefore the electrolytic capacitors with their undesirable thermal properties, may be dispensed with. A further improvement provided by the present invention resides in the condition that the compensating action for the nonlinearities is performed in an optimum manner. The invention also provides for considerable increase in the efficiency of operation of the circuit.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawings, in which:

Figure 1:
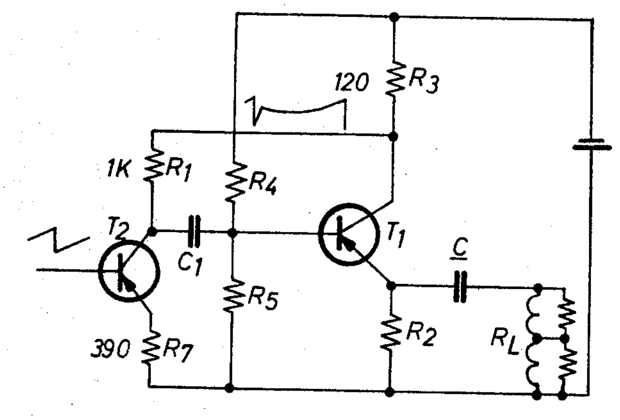
FIG. 1 is a simplified arrangement of the amplifier circuit, in accordance with the present invention.

Referring to the drawing, and in particular to FIG. 1, the latter represents a simple amplifier arrangement applicable to vertical deflection currents in television apparatus. The transistor $T_1$ is associated with the last stage of the amplifier and is connected to form a common collector circuit. The load of this last stage of the amplifier, is composed of the deflection coils L in parallel with the resistors *r*. The load L is connected to the emitter of the transistor $T_1$, by way of the coupling capacitor C. The resistor $R_2$ determines the operating point and the quiescent current of the transistor $T_1$. The resistor $R_2$ is substantially small compared to the load L, *r*.

In the collector circuit of the transistor $T_1$, is the resistor $R_3$ for the coupling voltage. The resistor $R_1$ is connected to the collector of the preamplifying transistor $T_2$ which is arranged in a common-emitter circuit. The voltage drop across the transistor $T_2$ and the emitter resistor $R_7$, determines further the operating point of the transistor $T_1$.

Figure 4:
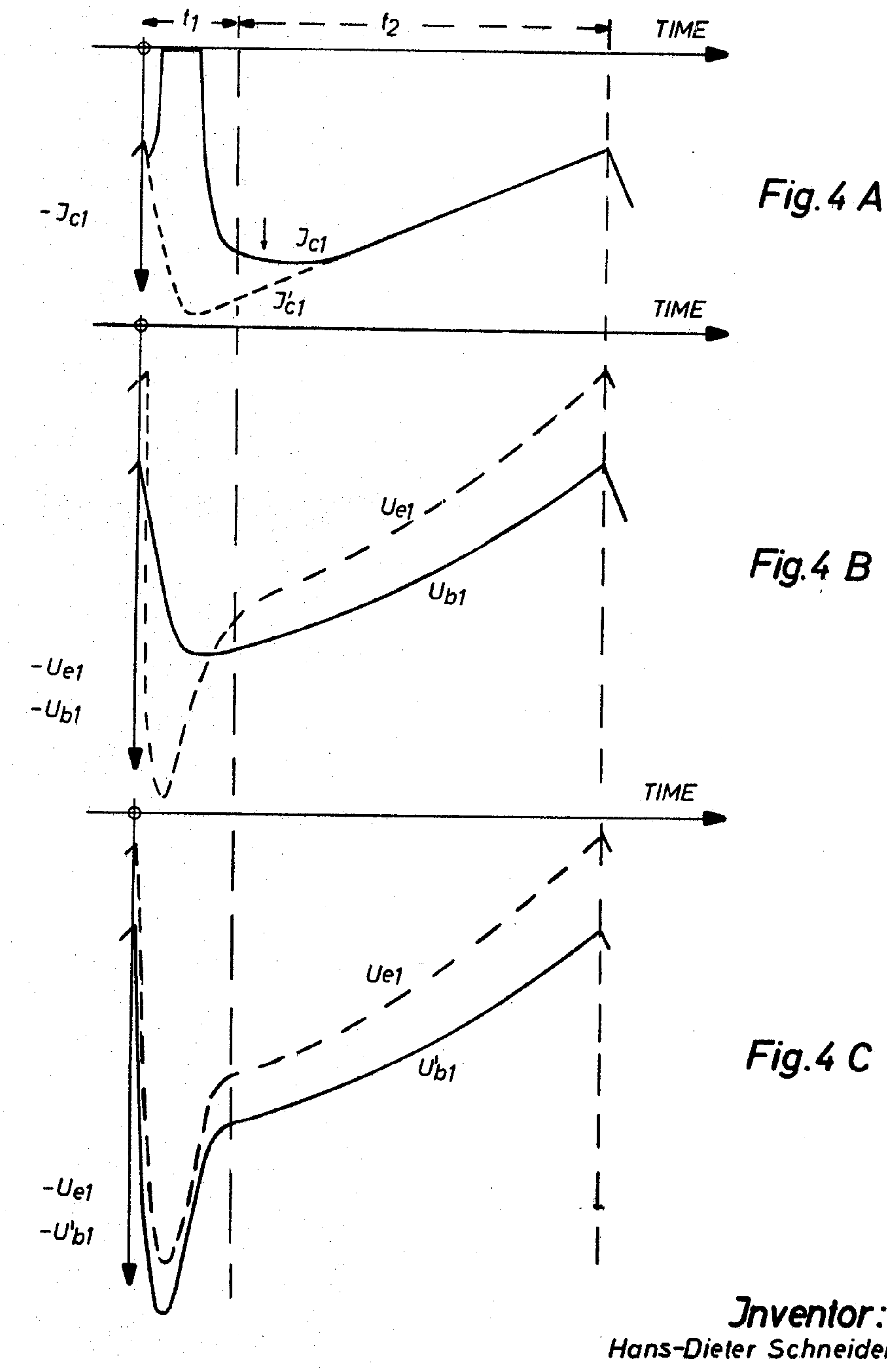
FIG. 4*a* including
FIGS. 4*b*, and 4*c* is a graphical plot of curves showing the operational conditions of the amplifier arrangement, in accordance with the present invention.

For the purpose of clarifying the operation of the invention, and the selection of the magnitudes of the resistors $R_1$ and $R_3$, FIG. 4 may be referred to. The latter is a graphical plot, as a function of time, of (A) the collector current $J_{c1}$ without feedback and $J'_{c1}$ with feedback, (B) of the emitter potential $U_{e1}$ and the base potential $U_{b1}$ again without feedback, and (C) of the emitter potential $U_{e1}$ and the base potential $U'_{b1}$ with feedback. In accordance with the invention the magnitudes of the resistors $R_1$ and $R_3$ are selected, so that the instantaneous potential of the base of the transistor $T_1$, $U'_{b1}$ is higher than the emitter potential thereof, during the entire saw-tooth period including the resetting time, and the transistor $T_1$ is in the conducting state. It is seen from FIG. 4A and B that without the feedback coupling, the emitter potential $U_{e1}$ moves in a direction which would cut off the transistor, as a result of the ebbing of the energy stored in the deflection coils $R_L$ during the retrace period $t_1$, if it were not for the presence of the resistors $R_1$ and $R_3$. The consequence thereof would be, that the energy stored during the forward trace cannot decay completely during the reset period and affects adversely the linearity at the beginning of the forward trace or sweep period, as shown in curve $J_{c1}$ (FIG. 4A) at the part marked by the arrow.

Through selection of a relatively large coupling ratio as determined mainly by the ratio $R_1$:$R_3$ and the impedance of the driver stage, as for example 1:10 the base potential exceeds, at all times, the emitter potential of transistor $T_1$, during the reset interval. In this manner, the transistor $T_1$ remains conducting and the reset energy may continuously decay during the time interval $t_1$. As a result, the base potential assumes the function shown by the curve $U'_{b10}$. The collector current $J'_{c1}$ varies, accordingly, in the manner shown by the corresponding curve in FIG. 4A.

The coupling arrangement of resistors $R_1$ and $R_3$, also leads to linearization of the emitter current during the forward trace interval $t_2$. Thus, the voltage level derived from the coupling arrangement, affects the base of the transistor $T_1$ so that it compensates for the nonlinearity of the emitter potential resulting from the capacitor coupling. One can, thereby, determine the required negative feed back voltage of the coupling arrangement through the consideration that the alternating emitter voltage, amplified by transistor $T_1$, is in phase with the voltage across the collector resistor $R_3$. The alternating emitter voltage is determined from the voltage divider comprising the resistor $R_7$, the internal resistance of the transistor $T_2$ and the resistor $R_1$. Since the internal resistance of the transistor $T_2$ is generally quite large, the magnitude of the feedback voltage is substantially dependent on the resistor $R_3$ and the amplification factor of the transistor $T_1$.

The simplified embodiment of FIG. 1 has the particular disadvantage that losses are incurred by the alternating current signal as a result of the resistor $R_2$.

Figure 2:
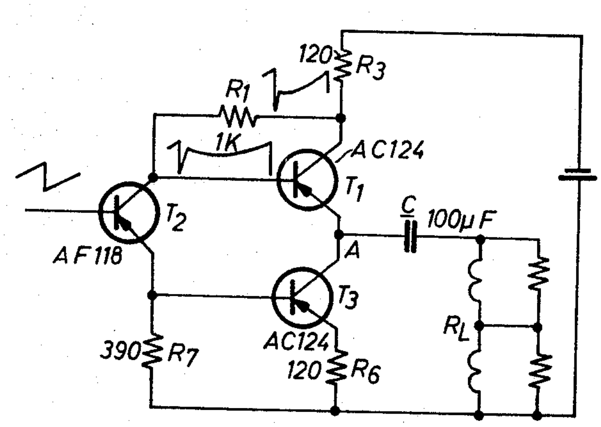
FIG. 2 is an electrical circuit diagram showing an improvement over the arrangement of FIG. 1 with the inclusion of direct-current components associated with the output signals.

This disadvantage is overcome with the embodiment of FIG. 2. The circuitry of this embodiment includes an amplifier for the vertical deflection of the electron beam for television tubes. For purposes of illustrating the application of this circuit, the component values appear adjacent to the respective circuit elements in the diagram of FIG. 2. The diagram includes, furthermore, the oscillographic voltages of the base of the driving stage $T_2$, collector of transistor $T_1$, the base of transistor $T_1$, the base of transistor $T_3$ as well as the load L, *r*.

In transforming the circuitry of FIG. 1, the resistor $R_2$ in FIG. 1 is replaced by an additional transistor $T_3$ in FIG. 2. If, now, a constant D-C level is applied to the base of this transistor $T_3$, the latter functions as a filter choke and raises, thereby, the output of the last stage. This is due to the condition that the A-C current flows almost only through the load L, *r*.

If, as shown in FIG. 2, an additional resistor $R_7$ is connected in the emitter lead of driver transistor $T_2$ and the emitter of this transistor is connected directly to the base of auxiliary transistor $T_3$, then a signal voltage of the opposite polarity to that applied to the base of output transistor $T_1$ will be applied to the base of auxiliary transistor $T_3$. The circuit then possesses the character of a complementary symmetry amplifier operating in class A, especially when, in contradistinction to the arrangement shown in FIG. 2, transistor $T_3$ is of the conductivity type opposite to that of transistor $T_1$ and $T_2$, that is, of the n-p-n type. In such a circuit arrangement it is known to construct the driver stage in such a manner that the mutually antiphased modulating voltages which it provides are of the same amplitude. This is attained by making the load resistors $R_1$ and $R_7$ of the driver stage equally large. According to the invention, however, these resistors are of different values, $R_1$ being in fact of higher value than $R_7$, so that with the negative feedback path open:

$$\frac{\gamma}{1+\delta}=\frac{R_7}{\dfrac{1}{\dfrac{h_{21c}-h_{12c}}{h_{11c}}}+}$$

where:

$h_{21c}$=short-circuit current gain[1]
$h_{12c}$=open-circuit voltage transfer[1]
$h_{11c}$=short-circuit input resistance[1]
$\gamma$=amplification factor for an input signal at the base of $T_2$, the collector of $T_2$ serving as the output electrode.
$\delta$=amplification factor of transistor $T_1$ in the common-emitter configuration, i.e. with the collector as output electrode and $R_3$ as load resistance.

If $R_7$ is made larger than or equal to 500 ohms, then for the usual types of transistor this may be written more simply:

$$\frac{\gamma}{1+\delta}\approx 1$$

In those cases where transistor $T_3$ is of the p-n-p type, as illustrated in FIG. 2, this transistor performs essentially the same function as resistor $R_2$ in FIG. 1. Modulation of $T_3$ then produces only a small increase in gain, even when $T_1$ and $T_3$ are symmetrically modulated, since the output impedance of $T_1$ is effectively the load impedance of $T_3$ and this has a value small compared with that of $R_L$. The output voltage appearing at point A in the circuit is thus determined substantially by the modulating voltage applied to the base of transistor $T_1$. In this case, therefore, it is not necessary that $T_3$ shall receive the same modulation voltage as $T_1$. Resistor $R_7$ may therefore be chosen with regard to the fact that the voltage drop across it serves to set the working points of transistors $T_3$ and $T_1$, owing to the fact that the emitter of transistor $T_2$ is connected directly to the base of transistor $T_3$. The bias voltage for the base of transistor $T_1$ may be produced in a simple manner by connecting the base of transistor $T_1$ directly with the collector of transistor $T_2$. The gain V' of the circuit is then described with sufficient accuracy by the equation:

$$V'=\frac{\gamma}{1+\delta}$$

where the symbols are as previously defined.

The efficiency of the output stage may be considerably improved by the use of this circuit arrangement. Although a push-pull circuit is not utilized this being realizable only by the use of a transistor of the complementary conductivity type, it becomes possible to compensate in this manner for the possible disadvange of increased load or working voltage being required by the resistor in the collector lead of the output stage transistor.

Figure 3:
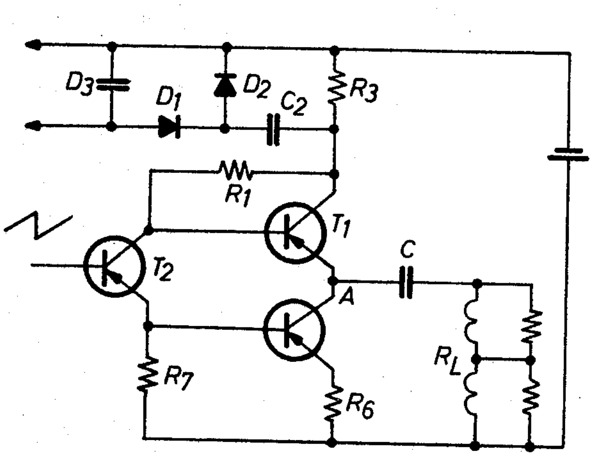
FIG. 3 is an electric circuit diagram for deriving, furthermore, a control voltage.

In known applications of amplifiers of this general type it has been proposed to provide means for producing gain control of the amplifier itself, or alternatively of the signal source from which it is fed, so that a constant signal current amplitude is produced in the load impedance. This may be achieved by rectifying the signal voltage appearing across an auxiliary resistor connected in series with the load impedance and employing the rectified voltage to control the gain. In transistor amplifiers according to the invention it is advantageous to derive the gain-control voltage across the auxiliary resistor in the collector lead of the output transistor, instead of from a resistor in series with the load impedance. Such an arrangement is shown in FIG. 3, the amplifier portion of which is identical with that of FIG. 2. Here, however, the signal potentials appearing at the collector of transistor $T_1$ are applied by way of a capacitor $C_2$ to the junction of two opposed diodes $D_1$, $D_2$ which thus develop across a capacitor $C_3$ a control voltage dependent upon the magnitude of the output current. This control voltage is made use of in known manner to control the amplitude of the signal applied to the amplifier in such a manner as to maintain the amplitude of the output current substantially constant.

What is claimed as new and desired to be secured by Letters Patent is:

1. A transistor amplifier for television apparatus comprising, in combination, a common-emitter driving stage including transistor means; a common-collector output stage including transistor means; conductor means conductively connecting the collector of said transistor means of said driving stage to the base of the transistor means of said output stage; cathode-ray tube deflection coil means; coupling capacitor means connected between said common-collector output stage and said cathode-ray tube deflection coil means; a power supply connected to said common-collector output stage; first resistor means connected between said power supply and said common-collector output stage means; second resistor means connected between the collector of said transistor means of said common-emitter driving stage and the collector of said transistor means of said common-collector output stage; biasing transistor means for biasing the transistor means of said common-collector output stage; and a resistor connected between the emitter of said biasing transistor means and said power supply, whereby said transistor means of said common-collector output stage is maintained in its conducting state during the period of deflection of said deflection coils.

2. A transistor amplifier for television apparatus comprising, in combination, a common-emitter driving stage including transistor means; a common-collector output stage including transistor means; conductor means conductively connecting the collector of said transistor means of said driving stage to the base of the transistor means of said output stage; cathode-ray tube deflection coil means; conductor means connecting said common-collector output stage to said cathode-ray tube deflection coil means; coupling capacitor means arranged in said latter conductor means; a power supply connected across the emitter-collector paths of said common-collector output stage and said common-emitter driving stage; first resistor means connected between said power supply and the collector of said transistor means of said common-collector output stage means; second resistor means connected between the collector of said transistor means and said common-emitter driving stage and the collector of said transistor means of said common-collector output stage; biasing transistor means the collector of which is connected to the emitter of the transistor means of said common-collector output stage for biasing the same, the base of said biasing transistor means being connected to the emitter of said transistor means of said driving stage; and a resistor connected between the emitter of said biasing transistor means and said power supply, whereby said transistor means of said common-collector output stage is maintained in its conducting state during the period of deflection of said deflection coils.

3. A transistor amplifier as defined in claim 2 including a third resistor means in the emitter of said transistor means of said common emitter driving stage.

4. A transistor amplifier as defined in claim 3 wherein the base of said biasing transistor is connected to said third resistor and to the emitter of the transistor means of said common emitter driving stage.

5. A transistor amplifier as defined in claim 4 wherein said third resistor means is substantially smaller than said second resistor means.

References Cited

UNITED STATES PATENTS

| | | | |
|---|---|---|---|
| 2,750,456 | 6/1956 | Waldhauer | 330—28 X |
| 3,079,566 | 2/1963 | Ebbinge | 330—20 |
| 3,098,199 | 7/1963 | Carney et al. | 330—29 |
| 3,125,693 | 3/1964 | De Clue | 330—18 X |
| 3,167,721 | 1/1965 | Broadhead | 330—28 X |

FOREIGN PATENTS 153,370 4/1952 Australia.

OTHER REFERENCES

Single Ended Amplifiers for Class B operation by Lin et al. Electronics Magazine, May 29, 1959, pp. 86–87.

Cathode Ray Tube Displays (book) by Soller, Starr, Valley. Received in U.S. Patent Office, Sept. 1, 1948 pp. 359–360.

RODNEY D. BENNETT, *Primary Examiner.*

JOHN W. CALDWELL, *Examiner.*

R. K. ECKERT, Jr., J. D. BAXTER, *Assistant Examiners.*